United States Patent [19]
Allen

[11] Patent Number: 4,757,965
[45] Date of Patent: Jul. 19, 1988

[54] CONDUIT CLAMP

[76] Inventor: C. M. Allen, 12 Warren Dr., Little Rock, Ark. 72209

[21] Appl. No.: 67,208

[22] Filed: Jun. 29, 1987

[51] Int. Cl.⁴ .............................................. F16L 3/08
[52] U.S. Cl. .................................... 248/74.4; 248/68.1
[58] Field of Search ................... 248/74.1, 74.3, 74.4, 248/62, 68.1, 74.5, 313, 230; 24/457, 458, 279, 483, 484, 16 R

[56] References Cited

U.S. PATENT DOCUMENTS

| | | |
|---|---|---|
| 791,504 | 6/1905 | Rosenfeld .............................. 248/62 |
| 3,298,721 | 1/1967 | Wiley . |
| 3,455,584 | 7/1969 | Henrickson . |
| 3,527,432 | 9/1970 | Lytle ..................................... 248/62 |
| 3,650,499 | 3/1972 | Biggane ............................... 248/62 |
| 4,044,428 | 8/1977 | Kowalski ............................. 24/16 R |
| 4,157,800 | 6/1979 | Senter ............................ 248/74.4 X |
| 4,185,802 | 1/1980 | Myles ................................. 248/74.4 |
| 4,417,711 | 11/1983 | Madej ................................ 248/74.4 |
| 4,516,296 | 5/1985 | Sherman ........................ 248/68.1 X |

*Primary Examiner*—J. Franklin Foss
*Attorney, Agent, or Firm*—Gravely, Lieder & Woodruff

[57] ABSTRACT

A clamp for clamping a conduit to an elongate structural supporting element having a central longitudinal axis. The clamp comprising a pair of complementary clamping straps adapted for clamping a conduit therebetween. Each strap has inner and outer end portions and a central portion therebetween, the inner end portions of the straps being engageable with the supporting element to mount the straps on the supporting element in a position wherein they extend outwardly from the supporting element on opposite sides of the conduit with the central portions of the straps disposed in face-to-face relation with the conduit. A fastener is provided for drawing the outer end portions of the clamping straps toward one another thereby to clamp the conduit between the central portions of the straps. The outer end portions of the straps are so twisted relative to the central portions of the straps that, when the clamping straps are drawn toward one another, the outer end portions of the straps are adapted to assume a position wherein they are generally parallel to one another but skewed or parallel relative to the central longitudinal axis of the supporting element.

20 Claims, 2 Drawing Sheets

CONDUIT CLAMP

BACKGROUND OF THE INVENTION

This invention relates generally to clamps, and more particularly to a clamp for clamping a conduit to a structural supporting element, such as a channel.

Conventional conduit clamps comprise a pair of metal straps, each having inner and outer end portions and a central portion therebetween. The inner end portions of the straps are typically configured for connection to a channel with the straps extending outwardly from the channel on opposite sides of the conduit and the central portions of the straps disposed in face-to-face relation with the conduit. The outer end portions of the straps are drawn toward one another by tightening a screw received through holes in the outer end portions thereby to clamp the conduit between the central portions of the straps. U.S. Pat. Nos. 2,375,513; 2,846,169; 3,417,951; 3,527,432; and 4,044,428 disclose conduit clamps of this type.

Using conduit clamps of the type described presents a problem in situations where a plurality of conduits are to be clamped side-by-side on a channel in that it is often difficult to tighten the screw of one clamp because of interference from an adjacent clamp. As shown in FIG. 1, this is because the plane of the outer end portion of each strap is generally parallel to the plane of the central and inner end portions of the strap. As a result, when one clamp is installed next to another clamp, the clamping screws are in alignment, which hinders access to the screw of the clamp being installed. This makes installation difficult.

SUMMARY OF THE INVENTION

Among the several objects of the invention may be noted the provision of an improved conduit clamp which is adapted for clamping a conduit to an elongate structural supporting element, such as a channel; the provision of such a conduit clamp which is especially adapted to facilitate clamping a series of conduits arranged in side-by-side relationship to a structural supporting element; the provision of such a conduit clamp which may readily be tightened or adjusted by a screw driver, even though an immediately adjacent conduit is clamped to the same supporting element by another conduit clamp; the provision of such a conduit clamp which is adapted to be easily attached to the supporting element; the provision of such a conduit clamp which is of simple construction; and the provision of such a conduit clamp which is durable and economical to manufacture.

Generally, a clamp of the present invention is adapted for clamping a conduit to an elongate structural supporting element having a central longitudinal axis. The clamp comprises a pair of complementary clamping straps adapted for clamping a conduit therebetween. Each strap has inner and outer end portions and a central portion therebetween, the inner end portions of the straps being engageable with the supporting element to mount the straps on the supporting element in a postion wherein they extend outwardly from the supporting element on opposite sides of the conduit with the central portions of the straps disposed in face-to-face relation with the conduit. Fastener means is provided for drawing the outer end portions of the clamping straps toward one another thereby to clamp the conduit between the central portions of the straps. The outer end portions of the straps are so twisted relative to the central portions of the straps that, when the clamping straps are drawn toward one another, the outer end portions of the straps are adapted to assume a position wherein they are generally parallel to one another but skewed or parallel relative to the central longitudinal axis of the supporting element.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
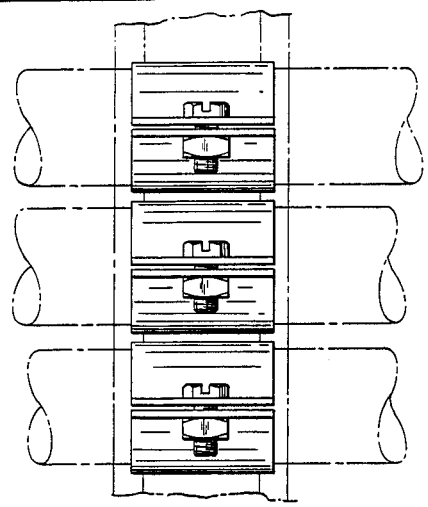
FIG. 1 is a plan view showing conventional clamps clamping a plurality of conduits on a structural supporting element (i.e., a channel)

Now referring to the drawings, a conduit clamp of the present invention is designated in its entirety by the reference numeral 1. The clamp 1 is especially useful for clamping a generally cylindric conduit 3, such as a gas or water pipe or a conduit for electric wires, to an elongate structural supporting element generally designated 5 (e.g., a channel support).

Figure 2:
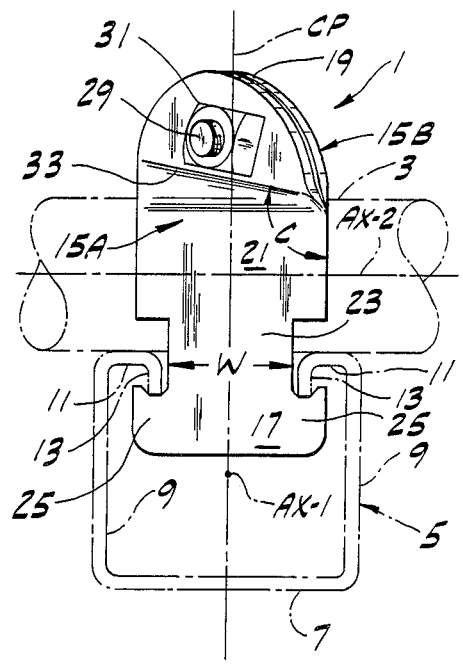
FIG. 2 is front elevational view of a conduit clamp of the prsent invention.

As shown in FIG. 2, the channel 5 has a central longitudinal axis AX-1 and comprises a base 7 and a pair of generally parallel sides 9 extending outwardly (upwardly in FIGS. 2 and 3) from the base. A pair of opposing inturned flanges 11 extend laterally inwardly (horizontally in FIGS. 2 and 3) from the outer edge of the sides 9. As used herein, "inwardly" and "outwardly" mean downwardly and upwardly, respectively, in FIGS. 2 and 3, and "laterally" inwardly and outwardly mean horizontally inwardly or outwardly with respect to a vertical center-plane CP through the clamp in FIGS. 2 and 4. Each flange 11 is inturned to form a lip 13 extending inwardly (downwardly in FIGS. 2 and 3) from the laterally inward edge of the flange.

The clamp 1 generally comprises a pair of identical, complementary clamping straps 15A and 15B having inner and outer end portions 17 and 19, and a central portion 21 therebetween. The inner end portions 17 of the straps 15A, 15B are engageable with the channel 5 to mount the straps on the channel. Each inner end portion 17 preferably comprises a flat stem 23 of reduced width W extending inwardly from the central portion 21 of the strap 15A, 15B and a pair of hook-shaped feet 25 extending laterally outwardly from the inner or lower end of the stem. The width W of the stem is preferably only slightly less the distance between the opposing inturned legs 13 of the channel 5. The feet 25 are hooked in the direction toward the central portion 21 of the strap 15A, 15B for hooking onto the lips 13 thereby to mount the strap on the channel 5.

Figure 3:
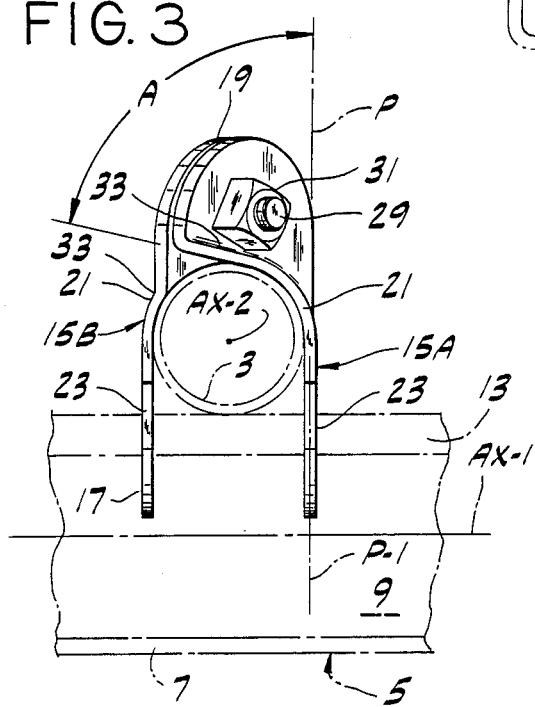
FIG. 3 is a side elevational view of the conduit clamp of FIG. 2.

As shown in FIG. 3, the central portion 21 of each strap 15A, 15B extends outwardly from the inner end portion 17 and is gradually bowed or bent approximately 70–90 degrees rearwardly from the plane P-1 of the inner end portion into an arcuate configuration (e.g., bent at an angle A of approximately 76 degrees) thereby substantially to conform to the surface of the conduit 3. When referring to strap 15A, "forwardly" and "rearwardly" mean in the direction rightwardly and leftwardly, respectively, as viewed in FIG. 3. However, when referring to strap 15B, "forwardly" means in the direction leftwardly in FIG. 3, and "rearwardly" means in the direction rightwardly, it being understood that strap 15B is turned laterally approximately 180 degrees from the position of strap 15A.

A hole (not shown) is provided in the outer portion 19 of each strap 15A, 15B for receiving a fastener such as a screw 29 and a nut 31 which constitute fastener means for drawing the outer end portions 19 of the clamping straps 15A and 15B toward one another thereby to clamp the conduit 3 between the central portions 21 of the straps. The screw 29 itself has a threaded shank which threads into the nut 31 and a head at the end of the shank. The head bears against the outer end portion 19 for the strap 15B, while the nut 31 is against the end portion 19 for the strap 15A. Preferably, the outer edge of each outer end portion 19 is gradually or gently curved outwardly from the sides of the strap 15A, 15B so that the outer portion has a generally crescent-shaped configuration (FIGS. 2 and 3).

Figure 4:
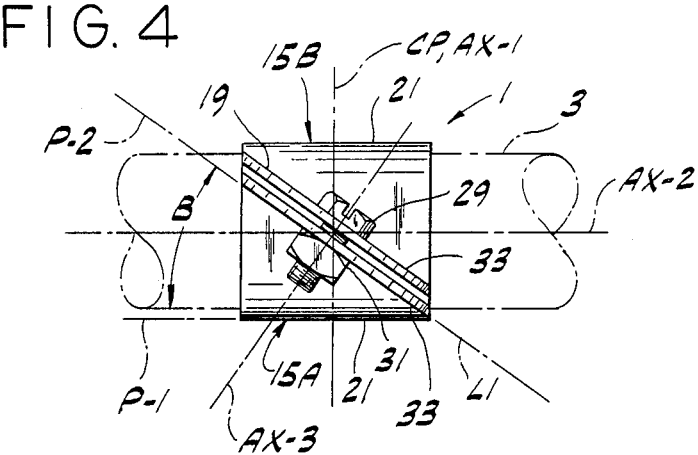
FIG. 4 is a top plan of the conduit clamp of FIGS. 2 and 3.
Figure 5:
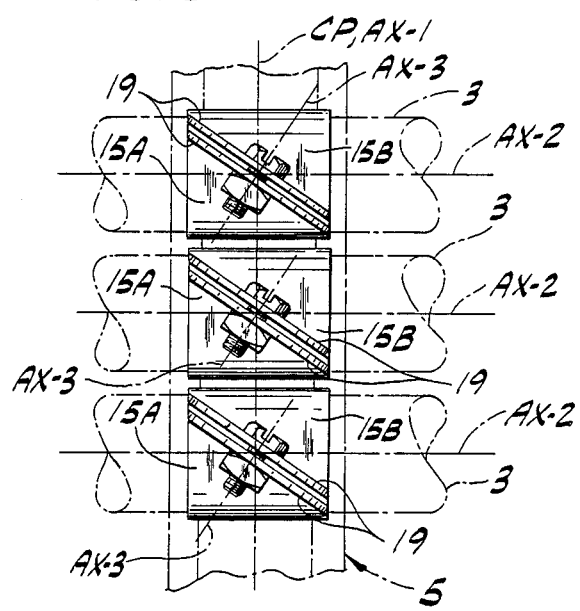
FIG. 5 is a top plan of three adjacent clamps of the type of FIGS. 2-4, illustrating use of the clamps on three conduits positioned side-by-side.

The outer end portion 19 of each strap 15A, 15B is bent along bend line 33 to extend outwardly from the outer and rearward end of the central portion 21. As shown in FIG. 4, bend line 33 extends transversely rearwardly and outwardly from one (right) side of the central portion 21 to the other (left) side of the central portion. The plane P-2 of the outer end portion 19 is twisted or skewed at an oblique angle B (e.g., 30–45 degrees) with respect to the plane P-1 of the inner end portion 17, it being observed that plane P-1 and P-2 intersect at line L-1 generally adjacent and parallel to the right side of strap 15A (see FIG. 4). The bend line 33 is inclined outwardly from the right side of strap 15A at an angle C (see FIG. 2) of approximately 100 degrees with respect to the right side edge of strap 15A. It will be observed that a shoulder is formed adjacent bend line 33 by the central portion 21 for engaging a flat of the nut 31, thereby preventing rotation of the nut so that the screw 29 can be tightened without placing a wrench on the nut.

The straps 15A and 15B are mounted on the channel 5 by inserting each inner end portion 17 in the channel with the plane P-1 of the lower end portion generally parallel to the central longitudinal axis AX-1 of the channel, and turning the respective strap until the plane of the inner end portion is generally perpendicular to the central longitudinal axis of the channel and the feet 25 engage the inwardly (downwardly in FIG. 2) extending lips 13. The straps 15A and 15B are then pushed to a postion wherein they extend outwardly from the channel 5 on opposite sides of the conduit 3 with the central portions 21 of the straps disposed in face-to-face relation with the conduit. The screw 29 and nut 31 are tightened to draw the outer end portions 19 of the straps 15A and 15B toward one another, thereby clamping the conduit 3 between the straps and securing it to the channel 5.

In accordance with this invention, the outer end portions 19 of the straps 15A, 15B are so twisted relative to the central portions 21 of the straps that, when the clamping straps are drawn toward one another, the outer end portions of the straps are adapted to assume a position wherein they are generally parallel to one another but skewed relative to the central longitudinal axis AX-1 of the channel 5 and the central longitudinal axis AX-2 of the conduit 3. Since the longitudinal axis AX-3 of the screw 29 is generally perpendicular to the plane P-2 of the outer portions 19, the longitudinal axis of the screw and the corresponding longitudinal axis (i.e., AX-3) of a screw driver (not shown) tightening the screw are also skewed relative to the central longitudinal axis AX-1 of the supporting element and the central longitudinal axis AX-2 of the conduit 3. It will, therefore, be observed that the screw driver has easy access to the screws irrespective of how closely other clamps are positioned to the clamp being tightened.

Alternatively, the outer end portions 19 may assume a position wherein they are generally perpendicular to the planes of the inner portions 17 of the straps 15A, 15B and to the central longitudinal axis AX-2 of the conduit 3, and generally parallel to the central longitudinal axis AX-1 of the channel 5. In this case, the central longitudinal axis AX-3 of the screw 29 and screw driver is generally parallel with respect to the central longitudinal axis AX-2 of the conduit 3, and there is ready access to the screw irrespective of how closely other clamps are positioned to the clamp being tightened. However, the outer portions 19 of the straps 15A, 15B and the central longitudinal axis AX-3 of the screw 29 are prefeably skewed with respect to the longitudinal axis AX-1 of the channel 5 and the longitudinal axis AX-2 of the conduit, since the outer end portions are more readily drawn together where the central longitudinal axis AX-3 of the screw is at an acute angle with respect to the central plane CP of the straps.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A clamp for clamping a conduit to an elongate structural supporting element having a central longitudinal axis, comprising a pair of complementary clamping straps adapted for clamping a conduit therebetween, each strap having inner and outer end portions and a central portion therebetween, the inner end portions of the straps being engageable with the supporting element to mount the straps on the supporting element in a position wherein they extend outwardly from the supporting element on opposite sides of the conduit with the central portions of the straps disposed in face-to-face relation with the conduit and manipulatable fastener means located at the outer end portions of the clamping straps for drawing the outer end portions of the clamping straps toward one another so as to move the central portions together and thereby clamp the conduit between the central portions of the straps, the fastening means being manipulatable along the outer end portion of at least one of the straps, the outer end portions of the straps being so twisted relative to the central portions of the straps that, when the clamping straps are drawn toward one another, the outer end portions of the straps are adapted to assume a position wherein they are generally parallel to one another but skewed or parallel relative to the central longitudinal axis of the supporting element.

2. A clamp as set forth in claim 1 wherein the outer end portions are so twisted relative to the central portions of the straps that, when the clamping straps are drawn toward one another, the outer end portions of the straps are adapted to assume a position wherein they are skewed relative to the central longitudinal axis of the supporting element.

3. A clamp as set forth in claim 2 wherein the outer end portions are twisted approximately 30–45 degrees laterally with respect to the central portion of the straps.

4. A clamp as set forth in claim 3 wherein the straps are of substantially identical construction.

5. A clamp as set forth in claim 2 wherein the inner end portion of each strap comprises a stem of reduced width extending inwardly from the central portion and a pair of feet extending laterally outwardly from the stem, the feet being adapted to engage a pair of opposing inturned flanges on the supporting element thereby to mount the strap thereon.

6. A clamp as set forth in claim 5 wherein the feet are hooked in a direction toward the central portion of the strap for hooking onto said flanges of the supporting element.

7. A clamp as set forth in claim 5 wherein the outer end portions of the straps are so twisted relative to the central portions of the straps that, when the clamping straps are drawn toward one another, the outer end portions of the straps are adapted to assume a position wherein they are skewed relative to the central longitudinal axis of the conduit.

8. A clamp as set forth in claim 7 wherein the outer end portions are twisted approximately 30–45 degrees laterally with respect to the central portion of the straps.

9. A clamp as set forth in claim 5 wherein the outer end portion of each strap has hole therein for receiving a fastener for pulling the straps toward each other.

10. A clamp as set forth in claim 1 wherein the straps are of substantially identical construction.

11. A clamp as set forth in claim 10 wherein the central portion of each strap is bent into an arcuate configuration adjacent its outer end portion thereby substantially to conform to a generally cylindric conduit.

12. A clamp as set forth in claim 11 wherein each strap is formed from a single strip of metal, and wherein the outer end portion of the strap is bent to extend outwardly from the arcuate central portion of the strap.

13. In combination with an elongated supporting element and a conduit which extends transversely across the conduit to be supported by the supporting element, an improved clamp for securing the conduit to the supporting element, said clamp comprising: a first strap located generally on one side of the conduit and a second strap located generally on the opposite side of the conduit, each strap having an inner end portion, an outer end portion and a central portion interposed between the two end portions, the inner end portion of each strap being engaged with the supporting element, the central portion of each strap bearing tightly against the sides of the of the conduit, the outer end portion of the two straps being generally skewed with respective to their respective central portions and oblique to the axis of the conduit; and a threaded fastener exending through the outer end portions with its axis oriented generally perpendicular to the outer end portions of the straps and generally oblique to the axis of the conduit, the fastener being turned down so as to urge the outer end portions together and the central portions tightly against the conduit, whereby the conduit is secured firmly to the supporting element.

14. The combination according to claim 13 wherein the outer end portions are generally parallel to each other.

15. The combination according to claim 14 wherein the supporting element is a channel having a base, a pair of spaced apart sides extended outwardly from the base, and a pair of flanges turned inwardly from the sides and spaced outwardly from the base, there being a flange on each side with a space between the two flanges; and wherein the inner end portion of each strap extends through the space between the two flanges of the supporting element and includes feet which fit behind those flanges.

16. The combination according to claim 13 wherein the fastener comprises a nut at the end portion for one of the straps; and a screw haing a shank which extends through the outer end portions of the two straps and is threaded into the nut, the screw also having a head which is against the outer end portion of the other strap, with the head being configured to be engaged by a tool for turning the screw, so as to move the nut toward the head and to draw the outer end portions of the two straps together.

17. The combination according to claim 13 wherein the central portions in configuration conform generally to the exposed surface of the conduit.

18. In combination with an elongated supporting element and a conduit which extends transversely across the supporting element to be supported thereby, an improved clamp for securing the conduit to the supporting element, said clamp comprising: a first strap located generally on one side of the conduit and a second clamp located generally on the other side of the conduit, each clamp having an inner end portion, an outer end portion and a central portion interposed between the two end portions, the inner end portion of each clamp being engaged with the supporting element, the central portion of each clamp bearing tightly against the conduit, and the outer end portion of each clamp being located beyond the conduit, so that the conduit is generally beween the supporting element and the outer end portions of the two straps, a nut at the outer end portion of one of the straps, and a screw having a shank extended through the outer end portions of the two straps and threaded into the nut, the screw also having a head that is against the outer end portion of the other strap, with the head being configured to be engaged by a tool for turning the screw, the screw being turned down in the nut so that the outer end portions of the straps are drawn together and with central portions bearing tightly against the conduit, the axis of the screw and nut being oblique to the axis of the conduit.

19. The combination according to claim 18 wherein the outer end portions of the two straps are generally flat and parallel to each other, the outer end portions lying in planes that are oblique to the axis of the conduit.

20. The combination according to claim 18 and further comprising at least one other conduit extended transversely across the supporting element parallel to the conduit which is secured by the improved clamp, and a clamp securing the other conduit to the supporting element, the clamp for the other conduit being adjacent to the improved clamp on the side thereof at which the head of the screw is presented, the head of the screw being engageable with a tool for turning the screw by reason of the oblique orientation of the screw shank.

* * * * *